United States Patent
Peterson

(10) Patent No.: US 8,763,513 B1
(45) Date of Patent: *Jul. 1, 2014

(54) HYDRAULIC CONTROL SYSTEM AND METHOD

(76) Inventor: Arnold Peterson, Van Nuys, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/364,825

(22) Filed: Feb. 2, 2012

Related U.S. Application Data

(63) Continuation of application No. 12/141,863, filed on Jun. 18, 2008, now Pat. No. 8,109,197.

(51) Int. Cl.
G05B 19/19 (2006.01)
F15B 9/03 (2006.01)

(52) U.S. Cl.
USPC .............................................. 91/361; 91/459

(58) Field of Classification Search
USPC .......................................... 91/361, 362, 459
See application file for complete search history.

(56) References Cited

U.S. PATENT DOCUMENTS

| | | | |
|---|---|---|---|
| 4,194,434 A | 3/1980 | Italiaander et al. |
| 4,235,156 A | 11/1980 | Olsen |
| 4,313,074 A | 1/1982 | Nomura et al. |
| 4,315,198 A | 2/1982 | Lin et al. |
| 4,679,489 A | 7/1987 | Jasinski et al. |
| 4,756,229 A | 7/1988 | Drakeley |
| 4,777,798 A | 10/1988 | Jacobson et al. |
| 4,901,625 A | 2/1990 | Bussan et al. |
| 4,951,549 A | 8/1990 | Olsen et al. |
| 5,012,722 A | 5/1991 | McCormick |
| 5,023,535 A | 6/1991 | Miller et al. |
| 5,383,390 A | 1/1995 | Lukich |
| 5,832,806 A | 11/1998 | Nelson |
| 6,124,696 A | 9/2000 | Rademacher et al. |
| 6,140,793 A | 10/2000 | Carr et al. |
| 6,142,059 A | 11/2000 | Chan et al. |
| 6,150,789 A | 11/2000 | Pulford, Jr. |
| 6,339,306 B1 | 1/2002 | Hara |
| 6,462,502 B1 | 10/2002 | Inui et al. |
| 6,563,285 B1 | 5/2003 | Eade et al. |
| 6,731,092 B2 | 5/2004 | Shimazaki |
| 6,756,749 B2 | 6/2004 | Haas et al. |
| 6,778,367 B1 | 8/2004 | Grendene |
| 6,806,675 B2 | 10/2004 | Wang et al. |
| 6,834,574 B2 | 12/2004 | Neumann |
| 6,853,162 B2 | 2/2005 | Betts et al. |
| 6,861,818 B2 | 3/2005 | Foster et al. |
| 6,870,346 B2 | 3/2005 | Davidov |
| 6,903,531 B2 | 6/2005 | Suomi et al. |
| 6,918,357 B2 | 7/2005 | Norris |
| 6,979,972 B2 | 12/2005 | Carolan |
| 7,047,865 B2 | 5/2006 | Neumann |
| 7,049,785 B2 | 5/2006 | Han |
| 7,062,832 B2 | 6/2006 | Yo et al. |
| 7,116,074 B2 | 10/2006 | Kuo |
| 7,170,254 B2 | 1/2007 | Yamada |
| 7,224,140 B2 | 5/2007 | Arefeen et al. |
| 7,239,108 B2 | 7/2007 | Best |
| 7,345,447 B2 | 3/2008 | Doutney et al. |
| 2006/0144217 A1 | 7/2006 | Neumann |

*Primary Examiner* — Thomas E Lazo

(74) *Attorney, Agent, or Firm* — Knobbe Martens Olson & Bear LLP

(57) ABSTRACT

A control system for controlling the movement of a system such as a hydraulic servo controlled gimbal systems. The system includes a plurality of actuators and sensors that sense the position of the actuators. On start up, a control system determines the present orientation of the system and compared it to a user defined desired orientation. The system operates in a first mode on start up where the control system moves the actuators so that the system is moved form the present orientation to the desired orientation at a controlled rate. Once the desired orientation is reached, control is then passed to a user controlled device such as a joystick.

8 Claims, 12 Drawing Sheets

HYDRAULIC CONTROL SYSTEM AND METHOD

CROSS-REFERENCE TO RELATED APPLICATIONS

This application is a continuation application of U.S. patent application Ser. No. 12/141,863 filed Jun. 18, 2008 (U.S. Pat. No. 8,109,197) and is related to applicant application entitled SYSTEMS AND METHODS FOR CONTROLLING HYDRAULIC ACTUATORS, application Ser. No. 12/141,803, Filed Jun. 18, 2008 (U.S. Pat. No. 8,069,772).

BACKGROUND OF THE INVENTION

1. Field of the Invention

The present invention relates to system for controlling hydraulic systems and, in particular, concerns a system that moves to an initial position on start up in a smoother and safer manner.

2. Description of the Related Art

Hydraulic systems, such as elevators, platforms and gimbals are used in a wide variety of applications. In one particular application, such hydraulic control systems control the positioning of platforms used as sets in movie, television or other theater applications. In this application, a control system allows the operator to position a platform in a specific orientation. In some more complicated applications, a plurality of independent gimbals with associated actuators are used to provide 3 or even 4 degrees of motion of the platform. In this way, the specific orientation of the platform can be very specifically controlled.

The typical hydraulic system that is used to control gimbaled structures, platforms, elevators and the like generally include one or more hydraulic actuators, such as pistons that move the physical structure, one or more motion sensors that detects the location of the physical structure or piston during the motion and a control system that regulates the actuator so as to result in controlled movement of the structure. One difficulty that occurs with such hydraulic structures is that the actuators have a tendency to settle when the system is shut down. When the system is then restarted, the system may want to immediately move the structure to a desired starting location. However, if the system has settled significantly, this may result in sudden movements of the platform.

In applications where people or sensitive equipment may be positioned on the platform, such sudden movements can be dangerous. People or equipment can be dislodged from the platform. Further, such sudden movements may also result in the movement structure being stressed to the point where the system may be damaged. While this problem is very common in hydraulic based movement systems, it is a problem that can also occur with any movement system where sudden unpredictable movements may occur such as, for example, upon start up. Other systems where this problem may occur include systems that use electric linear or rotary actuators that utilize analog absolute position transducers.

From the foregoing, it will be appreciated that there is a need for a system that can safely move platforms, such as multi-axis hydraulic or electric servo systems, in circumstances where the platform may be subject to sudden unpredictable movement. To this end, there is a need for a system that can move a platform to a desired orientation in a controlled manner even when the system has settled from a desired orientation.

SUMMARY OF THE INVENTION

The aforementioned needs are satisfied by the present invention which in one exemplary embodiment comprises a system for moving a platform, the system comprising at least one actuator coupled to the platform so as to move the platform into different orientations; at least one sensor that provides signals indicative of the present orientation of the platform; a user operable control that allows a user to move the actuator so as to change the orientation of the platform wherein the user operable control provides signals indicative of the desired orientation of the platform; and a controller that receives signals from the user operable control and the at least one sensor wherein the controller induces the at least one actuator to change the orientation of platform and wherein the controller analyzes the signals from the user operable control and the sensor and when the present orientation of the platform differs from the desired orientation of the platform by less than a pre-selected threshold, the controller induces the at least one actuator to move the platform towards the desired orientation at a first rate and when the present orientation of the platform differs from the desired orientation by more than the pre-selected threshold, the controller induces the at least one actuator to move the platform towards the desired orientation at a second rate, less than the first rate that is selected so as to reduce the risk of damage to the movement system and articles on the platform.

In another exemplary embodiment the invention comprises A system for moving a structure, the system comprising: at least one actuator coupled to the structure so as to move the platform into different orientations; at least one sensor that provides signals indicative of the present orientation of the structure; a user operable control that allows a user to move the actuator so as to change the orientation of the structure wherein the user operable control provides signals indicative of the desired orientation of the structure; and a controller that receives signals from the user operable control and the at least one sensor wherein the controller induces the at least one actuator to change the orientation of structure and wherein the controller, upon start up, determines whether the present orientation of the structure differs from the desired orientation of the structure and, if the present orientation of the structure corresponds to the desired orientation of the structure, the controller enters a first mode of operation wherein the at least one actuator is controlled by the user operable control and if the controller determines on start up that the present orientation of the structure does not correspond to the desired orientation, the controller enters a second mode of operation wherein the controller induces the at least one actuator to move the structure towards the desired orientation at a controlled rate.

In yet another aspect the invention comprises: A method of controlling the positioning of a structure, the method comprising: sensing the current orientation of the structure; sensing a desired orientation of the structure; moving the structure from the current orientation towards the desired orientation at a first rate when the current orientation differs from the desired orientation less than a pre-selected threshold; and moving the structure from the current orientation towards the desired orientation at a second rate, less than the first rate when the current orientation differs from the desired orientation more than the pre-selected threshold.

In yet another embodiment, the invention comprises: A method of controlling a system that positions a structure upon start up of the system, the method comprising: sensing the current orientation of the structure; sensing a desired orientation of the structure; sensing whether the system is in a start up mode; moving the structure from the present position to the desired position in a first rate in the start up mode until the present position corresponds to the desired position; terminating the start up mode when the present position corresponds to the desired position and there after moving the moving the structure from the current orientation towards the desired orientation at a second rate, greater than the first rage in an operation mode.

These and other objects and advantages will become more apparent from the following description taken in conjunction with the accompanying drawings.

DETAILED DESCRIPTION OF THE PREFERRED EMBODIMENT

Figure 1:
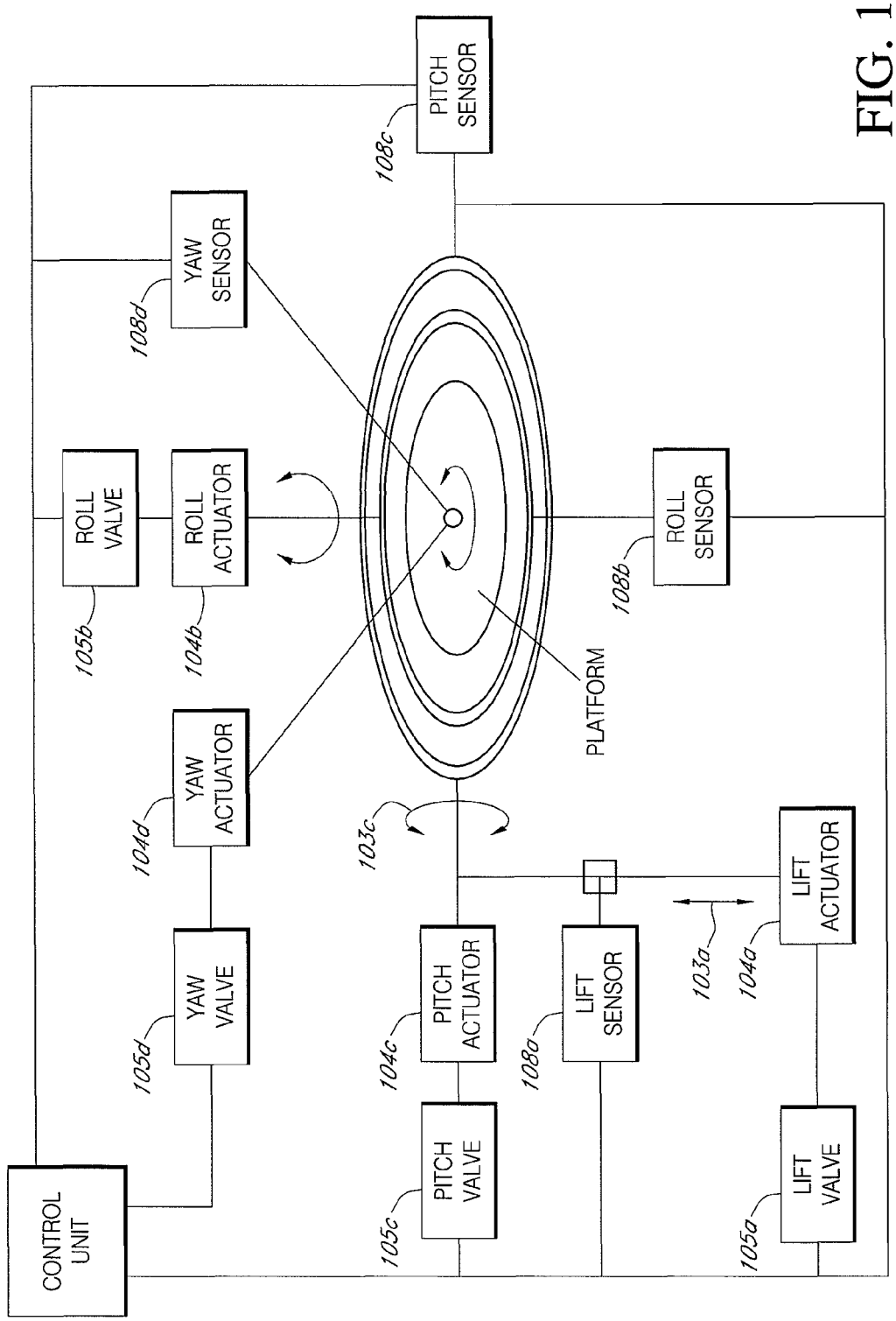
FIG. 1 is an exemplary schematic illustration of a multi-axis hydraulic servo-controlled gimbal system with an associated control system that implements more safe initiation and shut down of the system.

Reference will now be made to the drawings wherein like numerals refer to like parts throughout. FIG. 1 is a simplified schematic illustration of one embodiment of a multi-axis hydraulic servo controlled gimbal system 100 which includes a control system 102. As shown in FIG. 1, the system includes a plurality of gimbals with associated actuators 104a-d that respectively induce movement of a structure or platform 106 along 4 separate axis, lift, pitch, roll and yaw.

More specifically, in one exemplary implementation, the gimbals comprise hydraulic servo-controlled gimbals that allow a platform 106 to be lifted up and down along a lift axis 103a, moved about a roll axis 103b, moved about a pitch axis 103c and also moved about a yaw axis 103d. As shown, the movement along the axis 103a-d is bi-directional to thereby allow the platform 106 to be positioned in any of a number of different orientations.

As discussed above, the platform 106 can comprise any of the number of different platforms such as those used in film, television and theater applications without departing from the spirit of the present invention. Further, while the system 100 shows a 4 axes system, any of a number of different axes systems can be implemented without departing from the spirit of the present invention. While the system 100 shows a gimbal system, it will be appreciated that the actuators 104a-d can be used in conjunction with literally any kind of motion system without departing from the spirit of the present invention. Also, the actuators 104a-d can comprise an of a number of different types of actuators including hydraulic or pneumatic pistons, linear or rotary actuators and the like without departing from the spirit of the present invention.

As is also shown in FIG. 1, the control system 102 includes a plurality of sensors 108a-d that sense the position and movements of the actuators 104a-d respectively. The plurality of sensors provides signals to a control unit 110 so that the control unit can move the actuators 104a-d in a controlled manner. In one particular implementation, the sensors comprise linear position transducers, such as linear resistance transducers (LRTs) of a type known in the art. As will be described in greater detail below, the control unit 110 controls the operation of the actuators 104a-d so that, on start up, the actuators 104a-d move in a controlled fashion even if the actuators have settled significantly when 104a-d system 100 has been disabled. As is also shown in FIG. 1, each of the actuators comprise, in one embodiment, hydraulic pistons and have an associated valve 105a-d that controls the delivery of hydraulic fluid to the associated actuators of the gimbals 104a-d. In combination, the valves and pistons comprise hydraulic servo controlled gimbals that can be any of a number of different types known in the art.

Figure 2A:
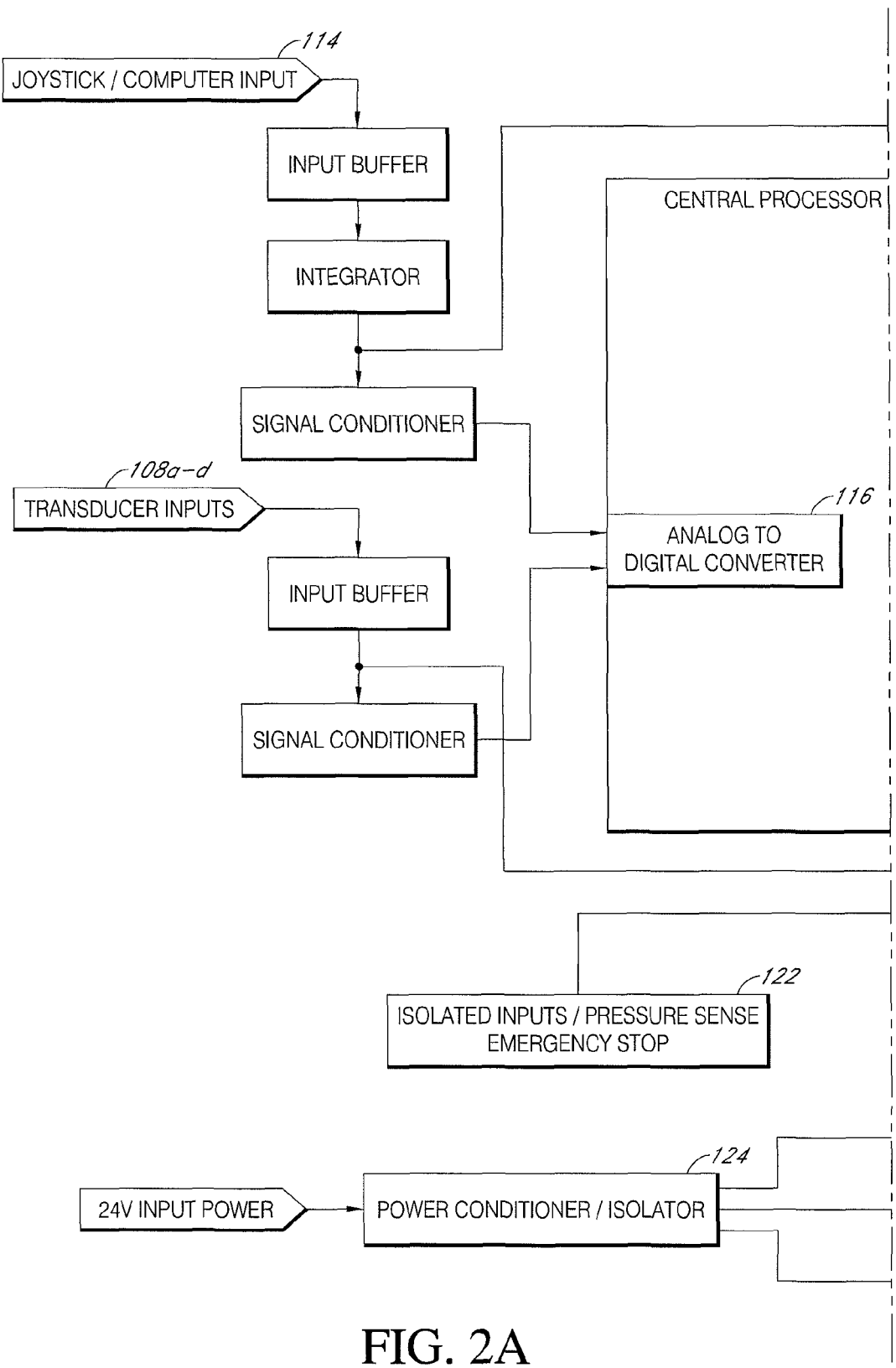
FIG. 2 is a block diagram illustrating the electrical components of the control system of FIG. 1.
Figure 2B:
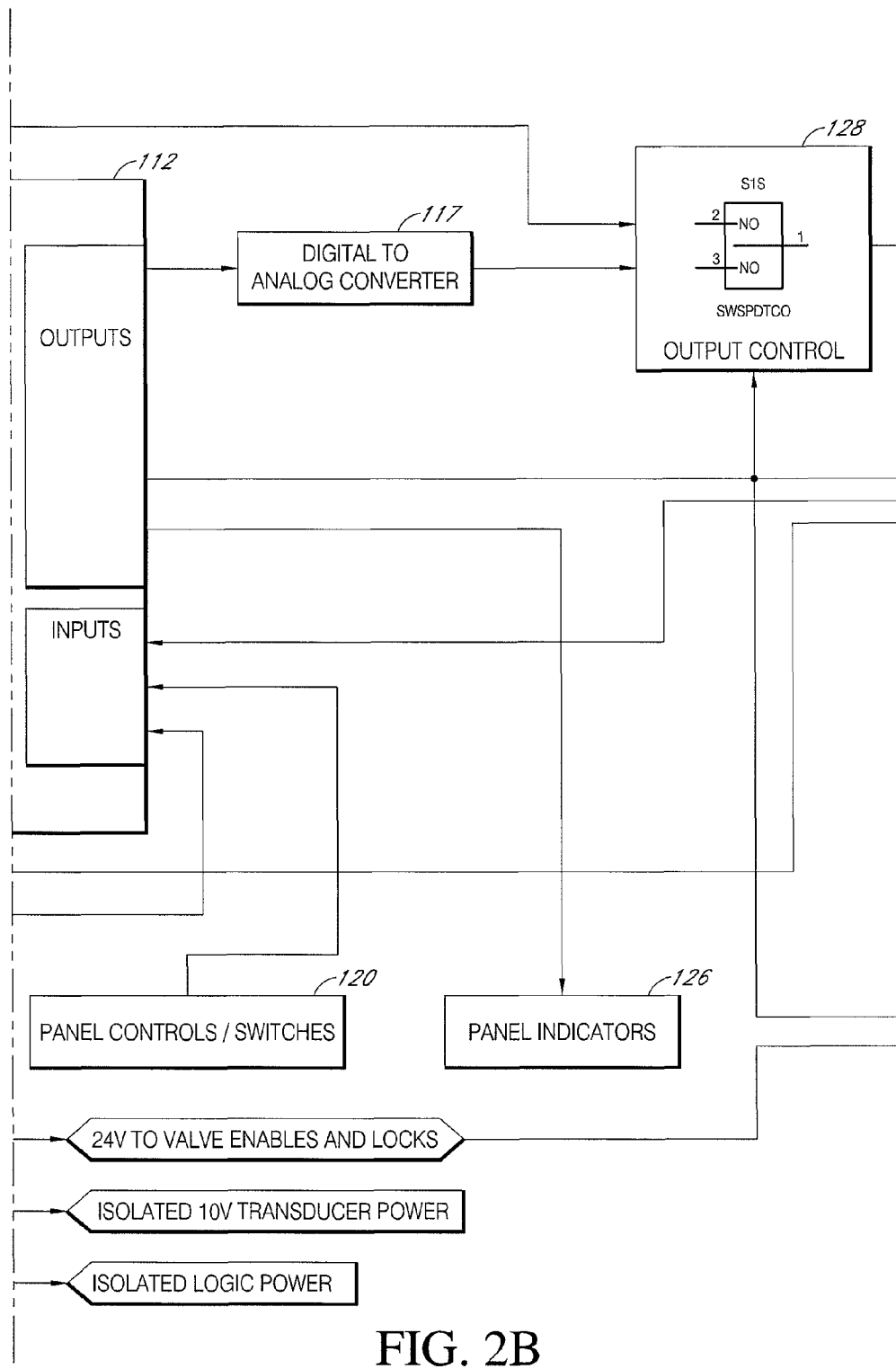
Figure 2:
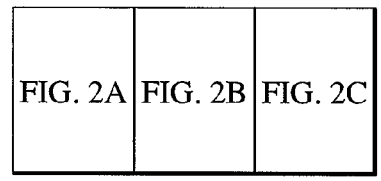
Figure 2C:
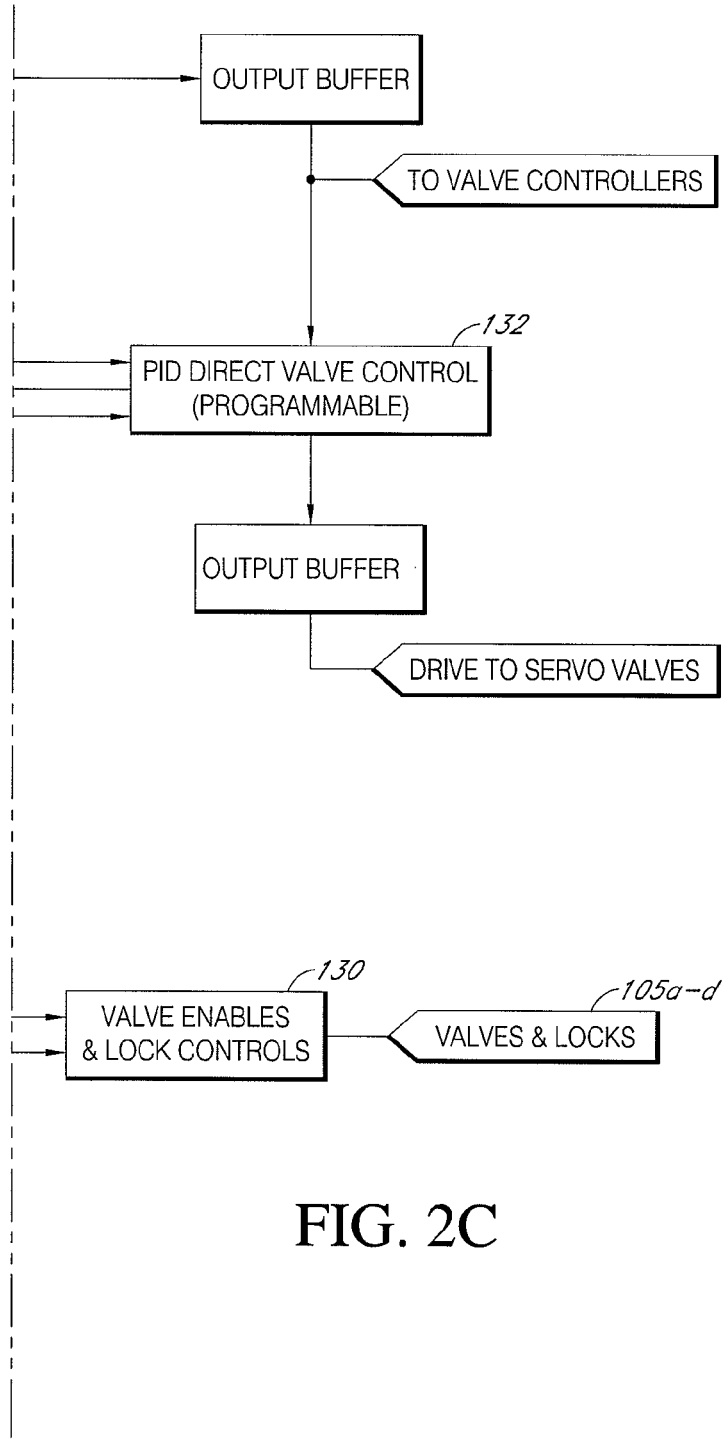

FIG. 2 is a block diagram that illustrates some of the components of the control unit 110. As shown, the control unit 110 includes a central processor 112 that receives inputs from a joystick 114 and the plurality of sensors or transducers 108a-d. The joystick 114 allows a user to position the platform 106 in a desired orientation by manipulation of the joystick 114 in a well known manner. Generally, the signals provided to the central processor 112 from the joystick 114 and the sensors 108a-d are buffered and processed in a well known manner. In this implementation, the signals are analog signals that are then transferred into digital signals via an analog to digital (A to D) converter 116 in a well known manner.

The central processor 112 also receives inputs from a plurality of panel control switches 120 whereby an operator can control the operation of the system 100. Various ones of these switches will be described in greater detail hereinbelow. Further, the central processor 112 also receives various isolated inputs 122 such as a pressure sense input that is sensing whether the pressure in the actuators 104a-d is too high or too low necessitating a stop to the system. Anther isolated input 122 that the central processor 112 may receive is an emergency stop input that allows the user to depress a single button to stop the operation and movement of the system in an emergency situation. Various other inputs can be provided to the processor 112 depending upon the configuration of the system 100 without departing from the spirit of the present invention. As is also shown in FIG. 2, power is provided to the control unit 110 and to the various valve and locks and actuators 104a-b via a power conditioner 124 of a type known in the art.

As is also shown in FIG. 2, the central processor 112 also has various outputs including panel indicators 126 that provide visual indications to the user of the operation of the system in known manner that will be described in greater detail hereinbelow. Further, the central processor 112 provides output control signals to an output control circuit 128 via a digital to analog converter 117 and also to the valve enables and lock controls 130 in a manner that will be described in greater detail below.

As will be discussed in greater detail below, the control of the actuators 104a-d is initially controlled via the central processor 112 to ensure a safe start up so that the position of the actuators 104a-d and associated gimbals match a desired position of the actuators 104a-d as indicated by the user using the joystick 114. Once the actuators 104a-d are matching the joystick 114, the output controls 128 switches control from the central processor 112 to the joystick 114. More specifically, the joystick 114 allows the user to position the gimbals into a desired orientation and the position of the actuators 104a-d controlling the movement of the gimbals are then compared to the expected position of the joystick 114 and once they correspond, control is then provided to the joystick 114. If the positions of the actuators 104a-d and the associated gimbals do not correspond, the actuators 104a-d and associated gimbals are then moved in a controlled fashion towards the position indicated by the joystick 114 to avoid sudden movements of the actuators 104a-d, associated gimbals or the platform 106.

Further, the central processor 112 can also provides optional output signals to the PID direct valve controls 134 so as to control the operation of the valves 105a-d of the actuators 104a-d in a manner known in the art. Further, as will be discussed in greater detail below, the output control 128 and the central processor 112 also provides valve enable and lock control signals to a valve enable and lock controls for each of the valves 105a-d in the manner that will be described in greater detail below.

Figure 3A:
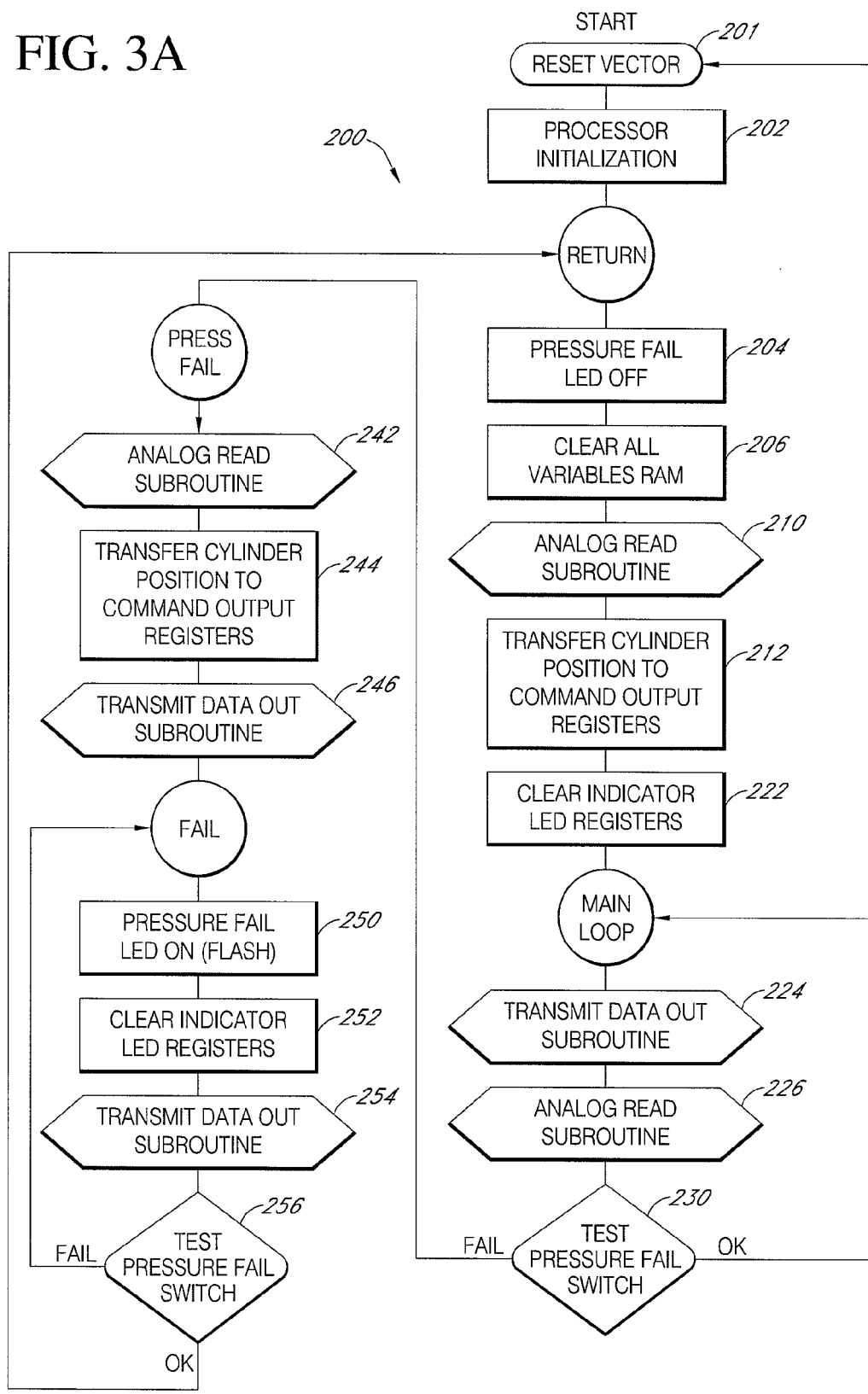
FIG. 3 is an exemplary flow chart illustrating the operation of the control system as it implements a more control loop for a safe initiation and shut down of the system.
Figures 3, 3B:
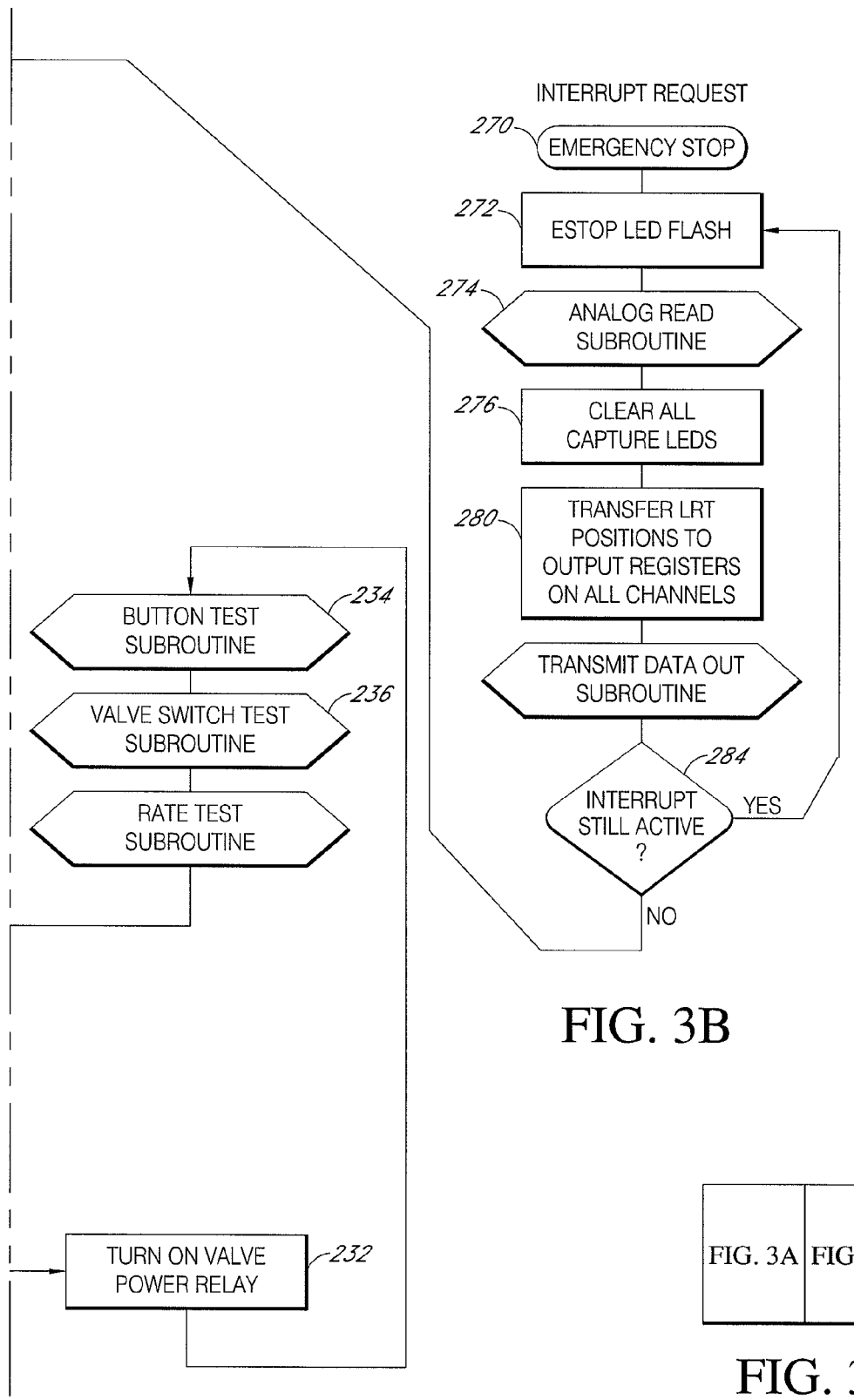

FIG. 3 is an exemplary flow chart that illustrates the operation of the control unit 110 as it implements a basic control loop controlling the start-up operation of the system 100. As will be described in greater detail below, the control unit 110 is configured to move the actuators 104 a-d and associated gimbals to a desired starting orientation in a safer manner. Specifically, the control unit 110 is configured to halt the movement of the actuators 104 a-d at the present location when a fault circumstance, such as pressure failure etc., occurs in the system 100. Further, the control unit 110 is also designed to read the user inputs from the joystick 114 and the transducer inputs 108a-d, so as to ensure that the movement of the actuators 104a-d towards a desired starting location is occurring at a pre-selected rate preferably a safe rate. The control unit 110 is also continuously monitoring the current output of the transducers 108a-d and, in the event that there is any fault or a tendency of the system 100 to move to suddenly, the control unit 110 is maintaining the affected actuators 104a-d at its' current orientation to inhibit sudden, sharp movements.

Referring specifically to FIG. 3, when power is first applied, to the control unit 110 enters a reset vector state 201 where boot up values are supplied to the control units 110 and the various outputs. The boot up values are pre-selected values that provide a starting location for the operation of the system 100. The control unit 110 then enters an initialization state 202 wherein memories in the central processor 112 are cleared and various components are positioned in start locations in a manner that is understood in the art.

The control unit 110 then turns the pressure fail LED output off, which is one of the panel indicators 126 (FIG. 2) in state 204 and clears variables in state 206 in the RAM memory associated with central processor 112 so as to begin the basic operational process. Once the control unit 110 is thus enabled, the control unit 110 then enters an analog read subroutine 210 where the inputs from the joystick 114 (FIG. 2) and inputs from the sensors or transducers 108a-d are read. Generally, these signals are indicative of the current orientation of the gimbals 104a-d as well as the current desired position of the joystick 114. In other words, the signals 108a-d provide an indication of the current position of the actuators 104a-d which provide information about the current orientation of the associated gimbals. The joystick 114 is providing corresponding positional or orientation information about where the user wants the gimbals to be positioned.

These signals are analog and are provided to the analog to digital converter (FIG. 2) of the central processor 112. The digital values are then provided to the central processor 112 and the central processor 112 then determines the corresponding current orientation of the actuators 104a-d and the desired positions of the joystick 114 and outputs analog values to the output control circuit 128 from the digital to analog converter 117. More specifically, the gimbal orientations or actuators positions are transferred in state 220 to the command output registers associated with valves 105a-d for each of the actuators 104a-d but are not latched into the controls for these valves at this point.

The control unit 110 then clears the indicator registers of the panel indicators 126 in state 222 and proceeds to the main operating loop of the system. In the main operating loop, the control unit 110 is going to move the actuators 104a-d to the desired starting orientation in a safer manner. The desired starting orientation can be a fixed orientation or an orientation that is provided by the joystick 114. Once the actuators 104a-d are in the desired starting orientation, the central processor 112 and output control unit 128 then transfers control of the actuators 104a-d to the joystick 114 as is shown in FIG. 2. In this way, the actuators 104a-d can be initiated and moved from an initial start up location into a starting location wherein control by the joystick 114 can be implemented in a safer manner.

Referring to FIG. 3, the control unit 110, in the main control loop proceed to a transfer data out subroutine in state 224 where the current actuator positions and gimbal orientations determined in state 210 are then provided to the valves 105a-d. At this point, the data is provided to the valves 105a-d, but the values are not locked into the valves 105a-d as the valves have not yet been enabled. By providing the values to the valves 105a-d ensures that, when the valves 105a-d are enabled, the correct values are provided to the valves when they are ultimately enabled and spurious values received at the valves prior to enablement are ignored.

Subsequently, the transducer inputs 108a-b, and joystick inputs 114 are re-read in state 226 in the same manner as described above in conjunction with state 210. As will be apparent from the following description, re-reading the readings from the transducers 108a-b and the joystick 114 on a periodic manner results in the ability to provide the valves 105a-d with values that enable any one of the actuators 104a-d to be halted at it's current orientation or position. It further allows adjustment in the movement of the system 100 based upon changes in the position of the joystick 114.

The control unit 110 then determines, in decision state 230 whether the pressure in the gimbals 104a-d has failed. If it has failed, e.g. the pressure is either too high or too low the system 100 has a potentially dangerous fault and the system 100 halts the movement of the gimbals 104a-d in their present orientation. More specifically, the control unit 110, upon determining that the pressure has failed, proceeds to the analog read subroutine 242 where the control unit obtains the present values of the joystick 114 and the transducers inputs 108a-d in the same manner as described above in conjunction with state 210.

This data is then translated and transferred out in states 244 and 246, in the same manner as described above in conjunction with states 220 and 224. In short, the present value of the transducers 108a-d is then output to the output controls so that the actuators 104a-d are then held at its current position without further movement. In this way, the system 100 can be halted due to a loss of pressure, or an overpressure situation at it's present orientation which reduces the likelihood of sudden unpredicted movements of the system 100 that could be dangerous to people or property.

Once the control unit 110 has stopped the motion of the actuators 104a-d at their present location, the control unit 110 then enables a pressure failure LED in state 250, which is one of the panel indicators (FIG. 2) to thereby advise the operator of the failure. The other indicator LED registers, providing indications of the operation of the system 100 are then disabled in state 252. The control unit 110 then continues to transmit the current position data out in state 254 in the same manner as described above so as to maintain the actuators 104a-d at their current orientation. The control unit 110 continues to determine if the pressure has failed in decision state 256 and will maintain the actuators 104a-d at their current orientation until the pressure situation has been resolved or otherwise overridden.

Returning to the description of the operation of the control unit 110 as it performs the main loop, if the control unit 110 determines in decision state 230 that there is no pressure failure, the control unit 110 then turns on the valve power relay in state 232 thereby providing power to the valves that regulate the flow of hydraulic fluid into the actuators 104a-d. In one implementation, this results in the valves 105a-d being powered but still does not enable the valves to provide fluid to the pistons to move the gimbals according to the data output in subroutine 224. It will be appreciated that different configurations in valves will result in different operational steps without departing from the spirit of the present invention.

The control unit 110 then proceeds to a button test subroutine 234. The button test subroutine 234 will be described in greater detail below in conjunction with FIG. 4. In general, the button test subroutine 234 permits movement of the actuators 104a-d and associated gimbals to the orientation dictated by the joystick 114 only when an input button for one or more of the axes 103a-d is depressed. The button test subroutine 234 also transfers the control of the valves and actuators 104a-d from the central processor 112 to the joystick 114 when it is determined that the gimbals 104a-d are in the orientation dictated by the joystick 114, e.g., the desired starting location.

The control unit 110 also performs a valve switch test subroutine 236 where switches that comprise inputs 120 (FIG. 2) to the central processor 112 are evaluated to determine if the user or operator has enabled the valves for one or more of the axes 103a-d of the system 100. In this implementation, if the user has enabled the switches corresponding to one or more axes 103a-d, the valves 105a-d are thus enabled thereby allowing the actuators 104a-d to be moved along the corresponding axis. As discussed above in conjunction with routine 224 and 232, the present orientation is fed into the valves 105a-d so that the valve 105a-d is being maintained at the present location so as to avoid sudden movements. The valve values can then be incremented or decremented to facilitate movement of the actuators 104a-d in a controlled manner to the desired joystick location in a manner that will be described in greater detail below.

Once the position values are set, the control unit 110 then begins to move the gimbals 104a-d to the desired orientation. The control unit 110 further evaluates whether in a rate test subroutine 240 whether the tracking error between expected position of the actuators 104a-d and the associated gimbals and the actual positions of the actuators 104a-d exceeds a pre-selected threshold. If the tracking error does exceed the threshold, the system will disable the actuators 104a-d thereby limiting the range of motion and speed of motion of the associated gimbals.

In this way, the actuators 104 a-d are prevented from moving to fast to the desired orientation. In the event that the actuators 104 a-d have settled so that their orientation on start up is more than is expected by the control unit 110, spontaneous large movements of the system 100 to overcome the unexpected position can be inhibited. The control unit 110 can either halt the movement of the system, or move the system at the pre-selected rate, which is preferably selected so that the risk of sudden large movements that could damage the equipment or people is reduced. The rate test subroutine 240 will be described in greater detail in reference to the flow chart of FIG. 8 hereinbelow.

As is also shown in FIG. 3, the control unit 110 also has an asynchronous emergency stop routine 270 that allows a user to halt all movement of the actuators 104a-d and associated gimbals by depressing the emergency stop. As shown, if the user has depressed the emergency stop input 122 (FIG. 2), the control unit 110 then enables the Stop LED flash in state 272 which is one of the panel indicators 126 (FIG. 2). Subsequently, the control unit 110 then performs the analog read subroutine 274 which is substantially the same as the analog read subroutine describe above in conjunction with functions 210 and 226. Essentially, the current orientation or position of the actuators 104a-d is captured from the transducers 108a-d so that the actuators 104a-d can be maintained at their current position.

The control unit 110 then clears all capture LEDs in state 276 indicating that none of the axes are captured and are in the stop mode. The control unit 110 then transfers in state 280 the LRT positions to the output registers of the valves 105a-d on all channels and performs a transmit data out subroutine in state 282 to thereby hold the actuators 104a-d at their current location. This holding orientation of the actuators 104a-d is maintained so long as the control unit 110 determines that the interrupt is still active in decision state 284. If the interrupt is inactivated, e.g., by the user turning off the emergency stop button, the control unit 110 then re-initiates in the manner described above.

In short, the system 100 in this embodiment operates as follows when performing the main control loop 200 described above. When power is provided to the system, the control unit 100 is enabled and the present positions or orientations of the actuators 104a-d is read. The valves controlling the operation of the actuators 104a-d are locked at this point. The current position of the actuators is then fed into the output so that the actuators 104a-d will be maintained at the current locations on start up rather than attempting to jump to a different start up location. The emergency stop and pressure failure inputs are asynchronously or periodically polled and the control unit 100 is configured to determine the present position or orientation of the actuators 104a-d and then halt the actuators 104a-d at that position or orientation when the pressure has failed or when the user has asynchronously hit the emergency stop override.

In the main control loop, the control unit 110 determines if the user is depressing a seek button and, if so, then reads the joystick and transducer values and moves the actuators 104a-d to the desired position, generally corresponding to the indicated position of the joystick 114. If the seek button becomes undepressed, the current transducer values are then output and latched into the valves 105a-d thereby holding the actuators 104a-d at their current position or orientation. This allows the user to immediately stop the movement of the gimbals if it is determined that a hazard or obstruction is occurring. If the user re-depresses the seek button, movement continues towards the desired orientation.

Figure 4:
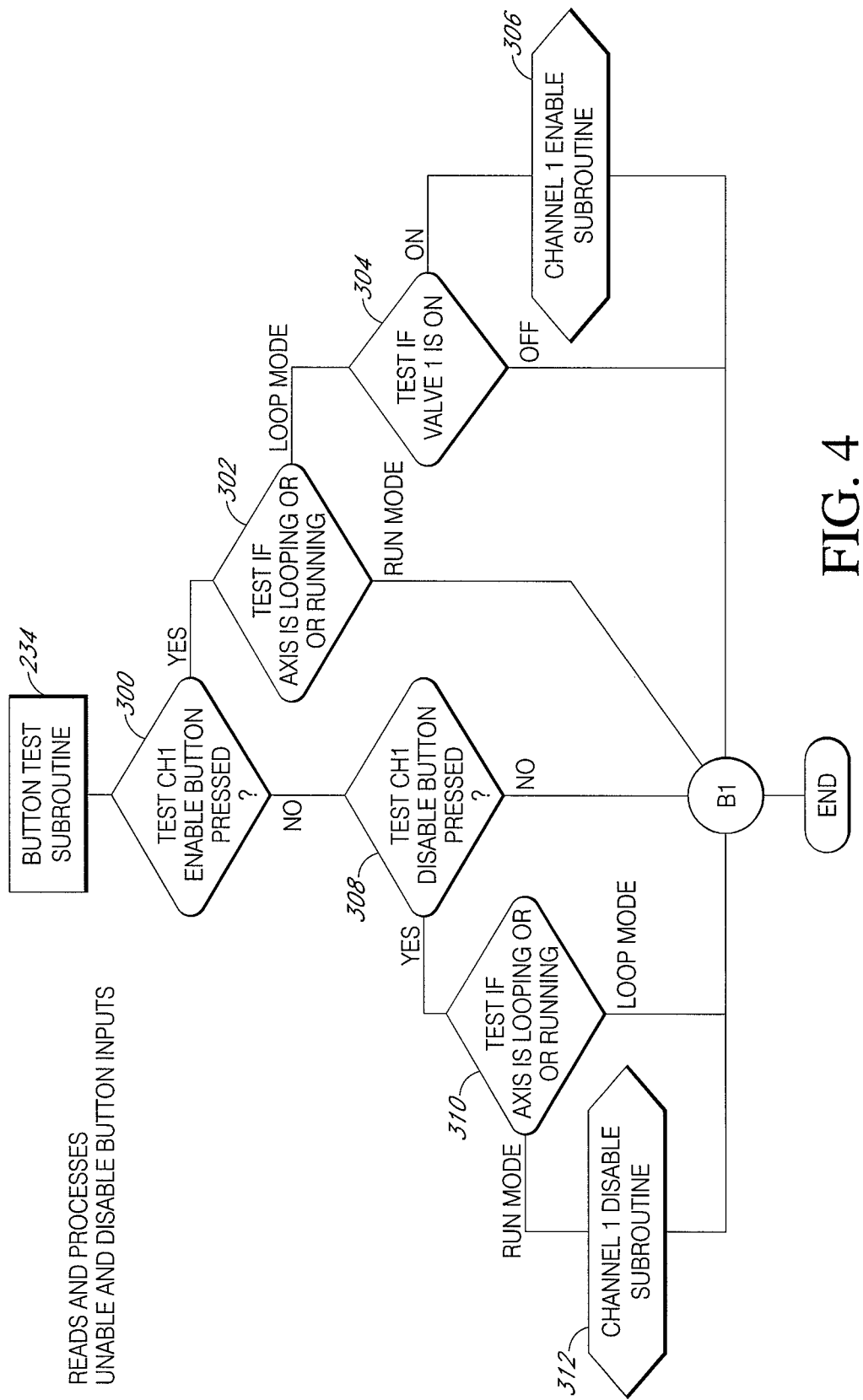
FIG. 4 is an exemplary flow chart illustrating the operation of the control system as it performs a button test subroutine of the main control loop of FIG. 3.

Referring now to FIG. 4, an exemplary flow chart illustrating the operation of the control unit 110 as it performs the button test subroutine 234 is shown. As discussed previously, the button test subroutine 234 permits movement of the actuators 104a-d along at least one axis provided a number of conditions are met. Specifically, the panel controls/switches 120 (FIG. 2) include an enable and disable button for each of the actuators 104a-d. The control unit 110 determines in decision state 300 whether the enable button for a particular actuator 104a-d is pressed. If it has been pressed by the user, the control unit 110 then determines in decision state 302 whether the actuator 104a-d on a particular axis is looping or running.

The actuator 104a-d is running if control along that axis has already been passed, by the output control 128, to the joystick 114 as the gimbal orientation corresponds to the joystick orientation. In the event the gimbal in question is determined to be running, the control unit 110 proceeds to the valve switch test subroutine 236 in the manner described above in connection with FIG. 3. If the control unit 110 determines in decision state 302 that the actuator 104a-d corresponding to one particular axis is in the loop mode, wherein the axis orientation has not yet matched the joystick orientation, the control unit 110 then determines in decision state 304 whether the valve 105a-d corresponding to the actuator 104a-d in question is enabled.

If the valve 105a-d is enabled, the control unit 110 then proceeds to a channel enable subroutine 306. In the channel enable subroutine 306, the control unit 110 determines if the output of the transducer 108a-d for the actuator 104a-d corresponds to the position of the joystick 114 and, if so, transfer control to the joystick 114. If it is transducer value does not match the joystick value, the control unit 110 is going to output signals to the valve in question to induce movement of the actuator 104a-d to the desired orientation in a controlled, preferably safe manner. In this way, the actuator 104a-d can be oriented to the joystick orientation in a safe and controlled manner. The channel enable routine will be described in greater detail below in conjunction with FIG. 5.

If the valve 105a-d is not enabled in decision state 304, the control unit 110 then proceeds to the valve switch test subroutine 236. If the control unit 110 determines in decision state 300 that the enable button for the channel in question was not pressed, the control unit 110 then determines in decision state 308 whether the disable button for the actuator 104a-d in question has been depressed. If it is not depressed, then the control unit proceeds to the valve switch test subroutine 236.

Alternatively, if the control unit 110 determines in decision block 308 that the disable button has been depressed, the control unit 110 then determines in decision state 310 whether the axis is looping or running in the same manner as discussed above in conjunction with decision state 302. If the axis is looping while the disable button is depressed, the control unit 110 proceeds to the valve switch test subroutine 236. Alternatively, if the axis is running and the disable button is depressed, the control unit 110 proceeds to the channel disable subroutine 312.

In the channel disable subroutine 312, the control unit 110 has determined that the user has decided to disable an axis or gimbal that was under the control of the joystick 114. The control unit 110 will then find the current position or orientation of the actuator 104a-d corresponding to the gimbal in question and then hold the actuator at its current orientation or position. The operation of the control unit as it implements the channel disable subroutine 312 will be described in greater detail in conjunction with FIG. 6.

Thus the button test subroutine 234 permits movement of the actuators 104a-d towards an orientation that corresponds to a start location or the orientation of the joystick 114 in a safe manner. The operation of the control unit 110 in the button test subroutine 234 has been described in conjunction with a single channel or axis or gimbal, but it will be appreciated that this subroutine will be repeated for all axes, channels and gimbals being utilized in the system 100.

Figure 5A:
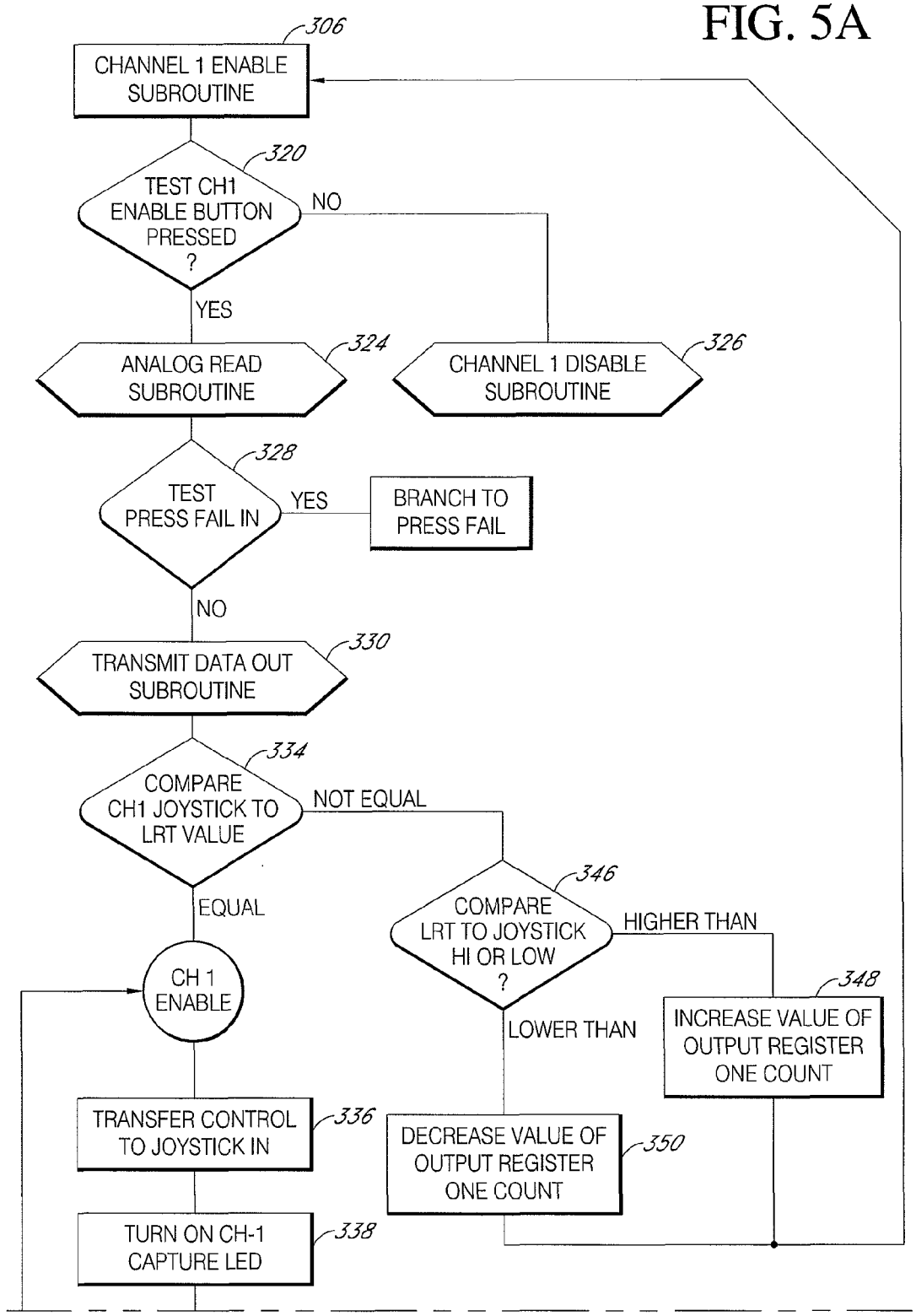
FIG. 5 is an exemplary flow chart illustrating the operation of the control system as it performs an enable subroutine of the main control loop of FIG. 3.
Figure 5B:
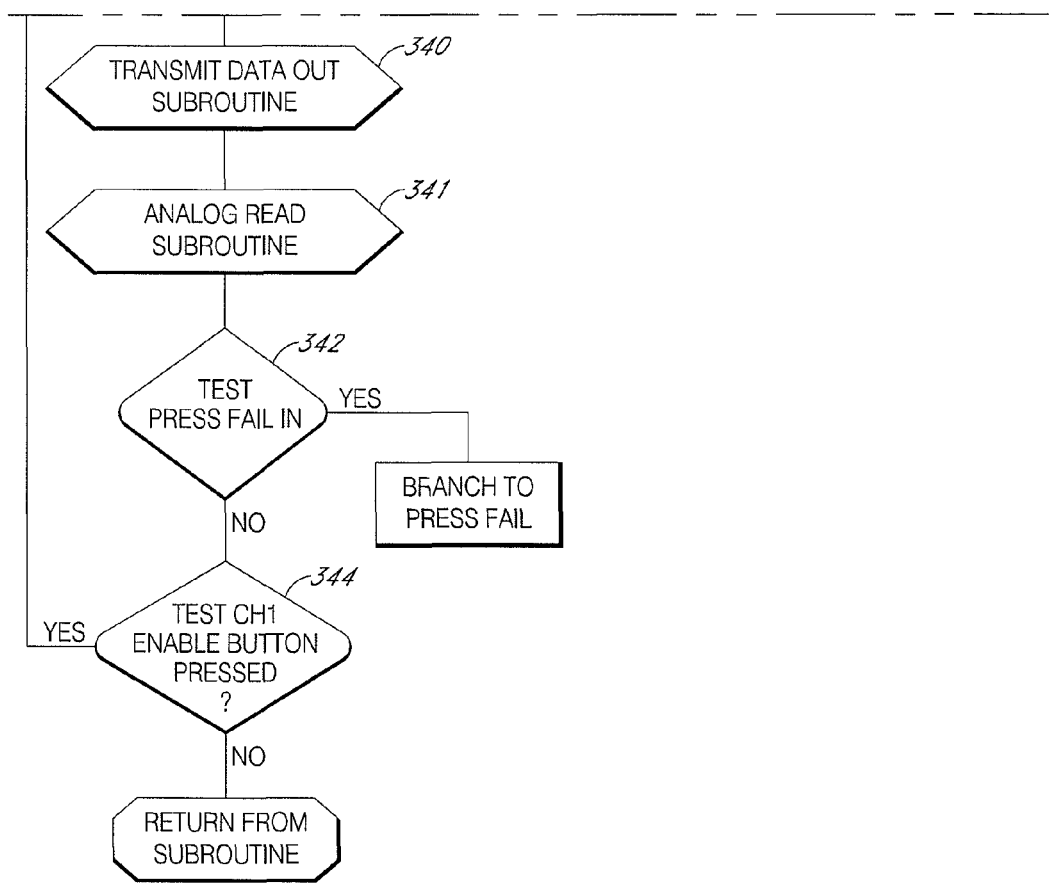
Figure 5:
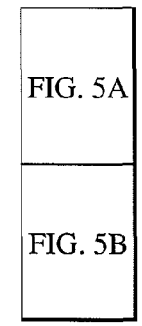

Referring now to FIG. 5, the channel or gimbal enable subroutine 306 is now described in greater detail. As shown, the control unit 110 initially determines whether the channel enable button has been depressed in decision state 320 in a similar manner as described above in conjunction with decision state 300. If the enable button is not depressed, the control unit 110 proceeds to disable the gimbal in subroutine 326 in a manner similar to the manner discussed above in conjunction with state 312.

If the enable button remains depressed, the control unit 110 then proceeds to an analog read subroutine wherein the current position of the transducer 105a-d in question and the joystick 114 position along the axis in question is obtained in a similar manner to that discussed above in conjunction with the subroutines 210, 226 (FIG. 3). The control unit 110 then checks the pressure in decision state 328 in a similar manner as discussed above in conjunction with decision state 280 (FIG. 2) and if there is a pressure failure, implements a pressure failure routine 329 similar to the routine discussed above in conjunction with states 242 through 256 (FIG. 3). The control unit 110 then implements a transmit data out subroutine in state 330, where the position values of the joystick 114 and the transducer 105a-d in question is transmitted outward to the output control 128 and the valve controls in the manner discussed above in conjunction with states 224, 246 (FIG. 3).

The control unit 110 then determines in decision state 334 whether the positional or orientation value for the transducer 105a-d in question corresponds to the same joystick value 114. If the values do correspond, then the actuators 1 104a-d in question is transferred in state 336 to the run mode where the directional control of the actuators 104a-d and associated gimbals directed by the joystick 114. When this occurs, the control unit 110 enables, in state 338, a capture LED to advise the user that the axis is now under control of the joystick 114.

The control unit 110 then continuously transfers the current transducer data and joystick data to the valve controls in state 340, performs the analog read subroutine 341 and determines if there is a pressure failure in decision state 342 in substantially the same manner as described above. In this way, the operation of the actuator 104a-d in question is controlled by the joystick 114 subject to the feedback of the corresponding transducer 108a-d. This process continues until the control unit 110 determines that the enable button is no longer enabled in decision state 344 in which case the control unit 110 proceeds to the valve switch test subroutine 236 (FIG. 2) in the manner described above.

If the control unit 110 determines in decision state 334 that the joystick value does not correspond to the transducer value, the control unit 110 keeps the gimbal 104a-d in question in the loop mode. More specifically, the control unit 110 determines in decision state 346 whether the compared transducer value is higher or lower than the corresponding joystick value. If the value of the joystick is higher, the value of the output register that is subsequently provided to the valve controls is incremented by one count in state 348. Alternatively, if the valve of the joystick is lower, the valve of the output register that is subsequently provided to the valve control in question is decreased by one count in state 350.

The output register values are then used by the control unit 110 to move the gimbal 104a-d in question towards correspondence with the corresponding joystick value. More specifically, the incremented or decremented output register values are returned to the valves 105a-d via the process flow via states 306 and decision state 320. Thus, when the control unit performs the analog read subroutine 324, the incremented or decremented output values are then combined with the output values sensed by the transducers 108a-d. Subsequently, when the resultant values are provided to the valves in the transmit data out subroutine 330, the values provided to the valves 105a-d include the incrementation or decrementation determined in decision state 346.

In this way, the actuator 104a-d in question and the associated gimbal can be moved towards the desired position indicated by the joystick 114 in a safe and controlled manner. The rate of the movement of the actuator 104a-d will be a function of the incrementing or decrementing and thus can be controlled to a safe rate. It will be appreciated that this process is repeated for each of the gimbals and axes used in the system 100 in question.

Figure 6:
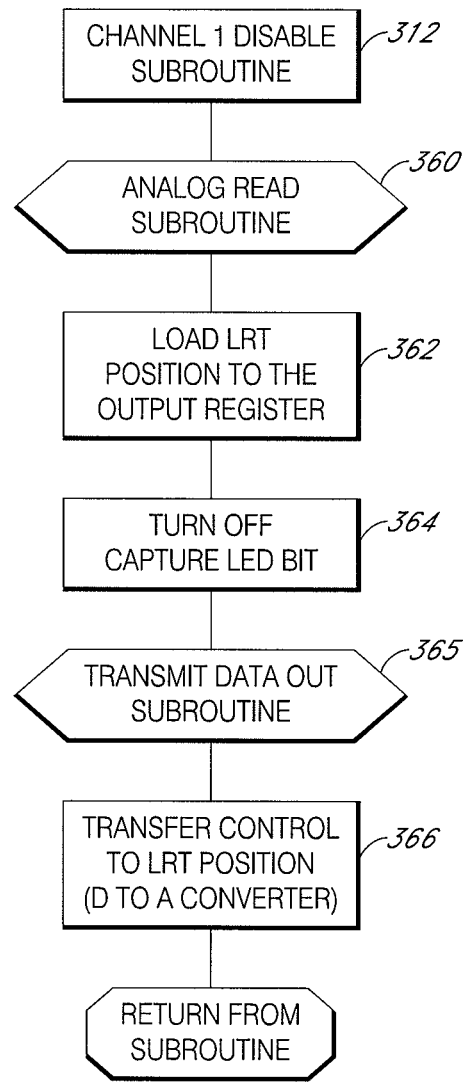
FIG. 6 is an exemplary flow chart illustrating the operation of the control system as it performs a disable subroutine of the main control loop of FIG. 3.

Referring now to FIG. 6, the gimbal disable subroutine 312 referred to above in FIG. 4 will now be described in greater detail. This subroutine returns control of the actuator 104a-d in question from the run mode to the loop mode where control passes back from the joystick 114 to the transducer position. More specifically, the control unit 110, upon entering the disable subroutine performs the analog read subroutine in state 360 in the same manner as discussed above in conjunction with state 224 (FIG. 2) to obtain the current transducer values. Those values are then loaded into the output register in state 362 in the same manner as discussed above in conjunction with state 222 (FIG. 2).

Subsequently, these values are provided to the control valves in a transmit data out subroutine 364 that is substantially the same as the subroutine described in conjunction with state 226 (FIG. 2). The control of the actuator 104a-d in question is then transferred back to the central processor 112 using the inputs from the transducers 108a-d until the conditions are met for the control of that actuator 104a-d to be passed back to the joystick 114 in the manner described above. In this implementation, the control is returned so that the current transducer values are provided to the valves so that the default position of the actuators 104a-d in question is to remain at its current position and orientation unless it is otherwise adjusted in the manner described above.

Figure 7:
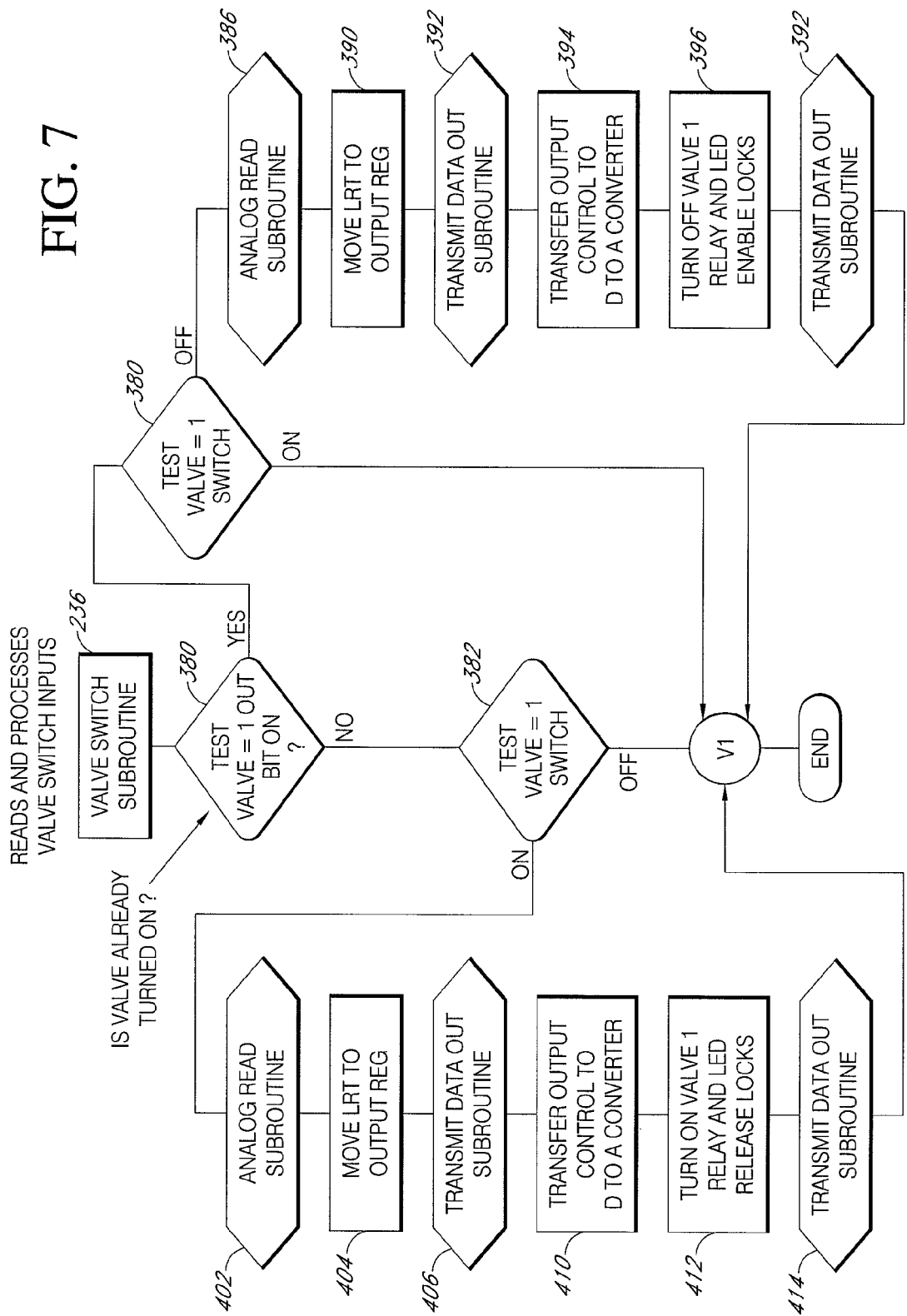
FIG. 7 is an exemplary flow chart of illustrating the operation of the control system as it performs a valve switch test subroutine of the main control loop of FIG. 3.

Turning now to FIG. 7, the valve switch subroutine 236 (FIG. 2) is now described in greater detail. The valve switch subroutine 236 checks to determine whether the user has turned a valve switch, one of the switches of the panel and control switch for one or more of the actuators 104a-d to an enable position indicating that the user wishes to control the operation of the actuator 104a-d in question with the joystick 114.

As shown, the control unit 110 initially determines if the valve 105a-d in question has already been turned on in decision state 380. The valve may have been turned on by a previous iteration of the main control loop. If the valve has already been turned on, the control unit 110 then determines in decision state 384 whether the switch is still on and, if it is, the control unit 110 then proceeds to the rate test subroutine 240 (FIG. 2). If the control unit determines in decision state 380 that the valve is not already on, the control unit then determines if the switch for the valve 105a-d in question is on or off. If the switch is off, the control unit 110 proceeds to the rate test subroutine 240 (FIG. 2).

Alternatively, if the valve 105a-d in question is off in decision state 380 and the switch is now on in state 382, the control unit 110 then proceeds to perform the analog read subroutine 402, to obtain the joystick values and the transducer values in substantially the same manner as described above. The transducer and joystick values are then transferred to the output registers in state 404 for subsequent use by the valves in the same manner as described above. Subsequently, the data is provided to the valves 105a-d in the transmit data out subroutine 406 in the same manner as described above and the output control is then transferred to the D to A converter in state 410. Subsequently, the locks are released on the valve 105a-d in question and the valve is also enabled and the transmit data out subroutine 414 is then performed thereby resulting in the output value being input to the valve so that the corresponding actuator 104a-d is maintained at it's current position.

In a similar manner substantially the same process is repeated by the control unit 110 in states 386 to 400 in FIG. 7 if the control unit 110 determines that the valve is turned on in state 380 but the switch has now been turned off. Control is then returned to the D to A loop process and the position and orientation of the gimbal in question is maintained at its current position and orientation. This function ensures that the default position and orientation of the gimbal in question is its presently determined position and orientation until both the valve is on and the user activated switch for the corresponding valve is also on. This process is repeated for each of the actuators 104a-d that are being implemented in the system 100.

Figure 8:
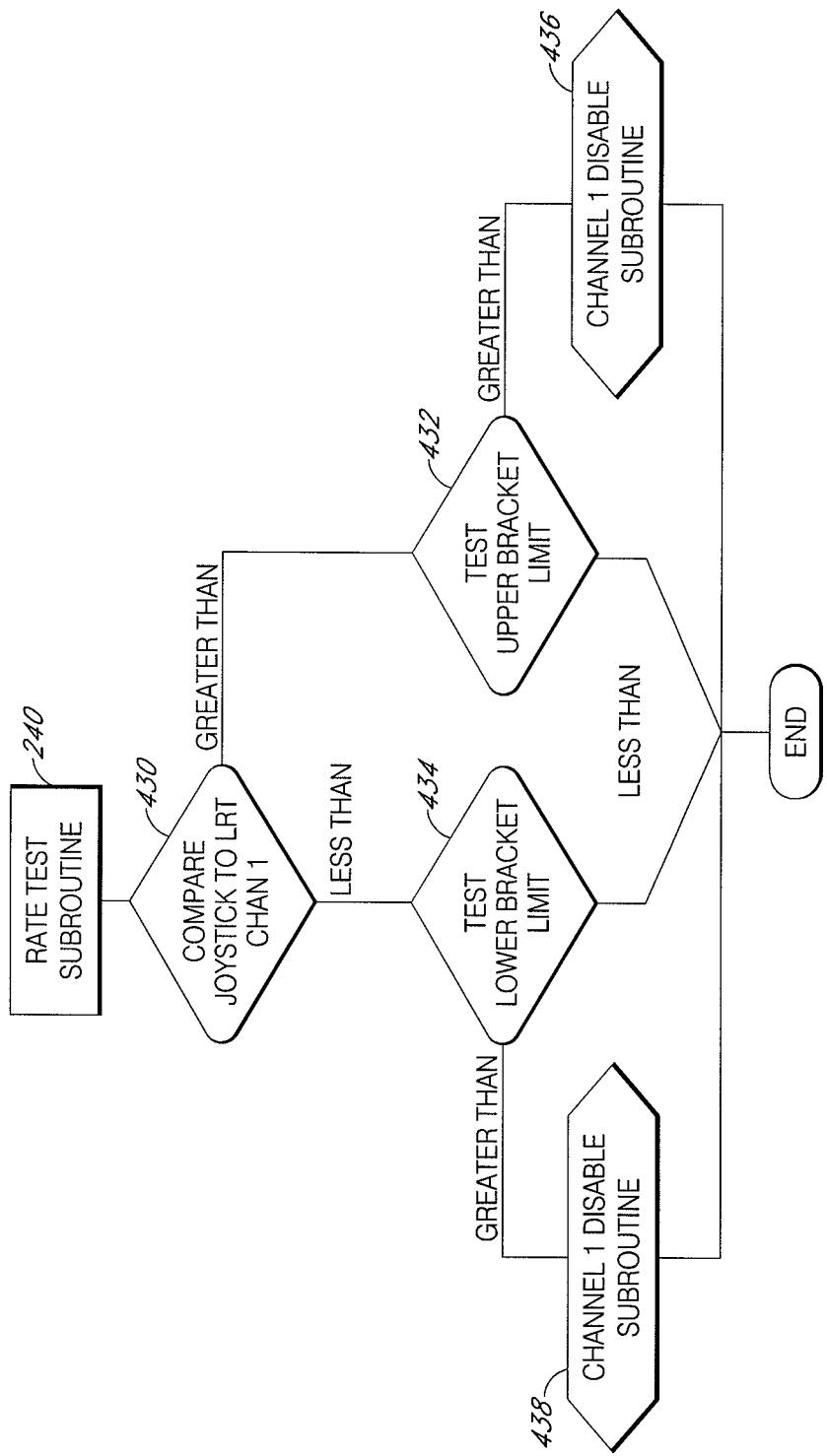
FIG. 8 is an exemplary flow chart illustrating the operation of the control system as it performs a rate test subroutine of the main control loop of FIG. 3.

Turning now to FIG. 8, a flow illustrating the operation of the control unit 110 as it implements the rate test subroutine 240 (FIG. 2) is now illustrated. As shown in FIG. 8, the main control unit initially compares whether the joystick value exceeds or is less than the transducer value in decision state 430. If the transducer value exceeds the joystick value for one of the actuator 104a-d, the control unit then determines in decision state 432 whether the joystick value exceeds the transducer value by a pre-selected upper bracket limit. If it is, the actuator 104 is then directed to a disable subroutine 436 which is substantially the same as the disable subroutine discussed above in conjunction with FIG. 6 which results in the actuator 104a-d in question being held at its current position. Similarly, if the joystick value is less than the transducer value by a pre-selected lower bracket limit the actuator 104a-d in question is similarly directed to a disable subroutine 438 which again holds the actuator in question in its current position or orientation.

From the foregoing it should be appreciated that the control system 102 controls the operation of the actuators 104a-d and associated gimbals in such a manner that the default position of the gimbals is to maintain its current position and orientation. When the gimbal is moving in the loop cycle, the position is updated towards the joystick position in a controlled fashion on each cycle so as to reduce the likelihood of the gimbal moving suddenly thereby causing danger to the equipment or persons on the platform 106 (FIG. 1). When the transducer position matches the joystick position, the joystick controls the gimbal movement unless the user intervenes, a fault occurs or the joystick and sensed positions become too far apart at which point the system returns to the default where the actuators 104a-d and associated gimbals are defaulted to their current position or are moved in a controlled or stepwise fashion.

Although the foregoing description has shown, illustrated and described various examples and embodiments of the present invention, it will be appreciated that various substitutions, changes, implementations and modifications of the present invention may be made by those skilled in the art without departing from the scope of the present invention. Thus, the present invention should not be limited to the foregoing description but should be defined by the appended claims.

What is claimed is:

1. A system for moving a platform, the system comprising:
at least one actuator coupled to the platform so as to move the platform into different orientations;
at least one sensor that provides signals indicative of the present orientation of the platform;
a user operable control that allows a user to move the actuator so as to change the orientation of the platform wherein the user operable control provides signals indicative of the desired orientation of the platform;
a controller that receives signals from the user operable control and the at least one sensor wherein the controller induces the at least one actuator to change the orientation of platform and wherein the controller analyzes the signals from the user operable control and the sensor and when the present orientation of the platform differs from the desired orientation of the platform by less than a pre-selected threshold, the controller induces the at least one actuator to move the platform towards the desired orientation at a first rate and when the present orientation of the platform differs from the desired orientation by more than the pre-selected threshold, the controller induces the at least one actuator to move the platform towards the desired orientation at a controlled rate, different than the first rate that is selected so as to reduce the risk of damage to the movement system and articles on the platform.

2. The system of claim 1, wherein the at least one actuator is coupled to the platform via at least one gimbal so that the at least one actuator moves the platform about an axis.

3. The system of claim 2, wherein the at least one actuator comprises four actuators that move the platform about a lift, roll, pitch and yaw axis.

4. The system of claim 1, wherein the at least one actuator comprises a hydraulic piston with an associated valve assembly.

5. The system of claim 4, wherein the at least one sensor comprises a transducer that senses the position of the hydraulic piston.

6. The system of claim 1, wherein the controller, upon activation of the system determines if the present orientation of the platform differs from the desired orientation by more than the pre-selected threshold and, if so, induces the at least one actuator to move the platform towards the desired orientation at the controlled rate.

7. The system of claim 6, wherein the controller provides output signals to the at least one actuator to induce the at least one actuator to move the platform towards the desired orientation, and wherein the output signals that are provided to the at least one actuator are indicative of the present orientation of the platform so that, in the event of a fault in the system, the platform is maintained by the at least one actuator in its present orientation.

8. The system of claim 7, wherein the user operable control includes a joystick and an enable switch and wherein the controller induces the at least one actuator to move the platform towards the desired orientation only when the user has manipulated the enable switch.

\* \* \* \* \*